(12) United States Patent
Dast et al.

(10) Patent No.: US 10,344,694 B2
(45) Date of Patent: Jul. 9, 2019

(54) CONTROLLING A SETPOINT CHARGING PRESSURE FOR A TURBOCHARGER

(71) Applicant: Dr. Ing. h.c. F. Porsche Aktiengesellschaft, Stuttgart (DE)

(72) Inventors: Alexander Dast, Engelsbrand-Grunbach (DE); Ulrich Franz Uhlirsch, Blaustein (DE); Dominik Lindner, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 99 days.

(21) Appl. No.: 15/626,201

(22) Filed: Jun. 19, 2017

(65) Prior Publication Data
US 2017/0363027 A1    Dec. 21, 2017

(30) Foreign Application Priority Data

Jun. 21, 2016   (DE) .......... 10 2016 111 298

(51) Int. Cl.
| F02D 41/14 | (2006.01) |
| F02D 41/00 | (2006.01) |
| F02D 23/00 | (2006.01) |
| F02B 37/12 | (2006.01) |
| F02B 37/24 | (2006.01) |

(52) U.S. Cl.
CPC .......... *F02D 41/1402* (2013.01); *F02B 37/12* (2013.01); *F02B 37/24* (2013.01); *F02D 41/0007* (2013.01); *F02D 41/145* (2013.01); *F02D 23/00* (2013.01); *F02D 2041/141* (2013.01); *F02D 2041/1432* (2013.01); *F02D 2200/0402* (2013.01); *F02D 2200/0406* (2013.01)

(58) Field of Classification Search
CPC ................... F02D 23/00; F02D 41/007; F02D 2200/0402; F02D 2200/0406; F02D 41/0007; F02B 37/12
See application file for complete search history.

(56) References Cited

U.S. PATENT DOCUMENTS

| 6,161,383 A | 12/2000 | Aschner et al. |
| 2009/0101108 A1 | 4/2009 | Wagner et al. |
| 2015/0275791 A1* | 10/2015 | Yasui ................. F02D 41/0007 701/102 |

FOREIGN PATENT DOCUMENTS

| DE | 19751977 A1 | 5/1999 |
| DE | 102007050026 A1 | 4/2009 |

(Continued)

*Primary Examiner* — Audrey K Bradley
(74) *Attorney, Agent, or Firm* — Leydig, Voit & Mayer, Ltd.

(57) ABSTRACT

A method for controlling a setpoint charging pressure for a turbocharger includes determining a charge-based setpoint charging pressure on the basis of a charge of the internal combustion engine, sampling an actual charging pressure, determining a carried-along actual charging pressure on the basis of the actual charging pressure, determining an offset on the basis of the charge-based setpoint charging pressure, and adjusting, by open-loop control, the setpoint charging pressure to the charge-based setpoint charging pressure by a first-order timing element if the carried-along actual charging pressure exceeds a first value which is lower than the charge-based setpoint charging pressure by the offset.

10 Claims, 5 Drawing Sheets

(56) References Cited

FOREIGN PATENT DOCUMENTS

DE 102008042510 A1 4/2010
DE 102011006227 A1 10/2012

* cited by examiner

CONTROLLING A SETPOINT CHARGING PRESSURE FOR A TURBOCHARGER

CROSS REFERENCE TO RELATED APPLICATIONS

This application claims benefit to German Patent Application No. DE 10 2016 111 298.4, filed Jun. 21, 2016, which is hereby incorporated by reference herein.

FIELD

The present invention relates to a turbocharger of an internal combustion engine, and in particular, to methods and systems for controlling a turbocharger of an internal combustion engine.

BACKGROUND

A motor vehicle comprises a drive train having an internal combustion engine. The internal combustion engine is equipped with a turbocharger which comprises an exhaust gas turbine and a compressor. The exhaust gas turbine is driven from a current of exhaust gas from the internal combustion engine and itself drives the compressor which compresses fresh air for the internal combustion engine. The pressure of the fresh air which is produced in the process is referred to as charging pressure. The charging pressure can be controlled, for example, by correspondingly adjusting a variable turbine geometry of the turbocharger. Other possible ways of adapting the charging pressure comprise discharging excess compressed air on the compressor side or directing part of the exhaust gas stream past the exhaust gas turbine.

In particular, when the drive train is used in a motor vehicle, rapid or frequent load changes of the internal combustion engine may be necessary. In this context, different parameters of the internal combustion engine, one of which is the charging pressure, are changed. The most decisive factor for a harmonious buildup of tractive force is that the actual charging pressure of the turbocharger follows a predefined setpoint charging pressure as rapidly as possible and as far as possible without overshooting. For this purpose, until now to a certain extent costly proportional-integral-differential controllers (PID controllers) have been used, the parameters of which were costly to change.

DE 10 2011 006 227 A1 relates to technology for performing pilot-control of a controller. In this context, the target variable is changed suddenly in successive phases.

DE 197 51 977 A1 proposes adjusting a turbine geometry on a turbocharger as a function of the sum of a predefined value and of a pilot-control value.

DE 10 2007 050 026 A1 relates to the determination of a fault during the adjustment of a value by closed-loop control to a predetermined value.

SUMMARY

In an embodiment, the present invention provides a method for controlling a setpoint charging pressure for a turbocharger which is driven by exhaust gas of an internal combustion engine. The method includes determining a charge-based setpoint charging pressure on the basis of a charge of the internal combustion engine; sampling an actual charging pressure; determining a carried-along actual charging pressure on the basis of the actual charging pressure; determining an offset on the basis of the charge-based setpoint charging pressure; and adjusting, by open-loop control, the setpoint charging pressure to the charge-based setpoint charging pressure by a first-order timing element if the carried-along actual charging pressure exceeds a first value which is lower than the charge-based setpoint charging pressure by the offset.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

The invention will be described in more detail now with reference to the appended figures, wherein.

DETAILED DESCRIPTION

Figure 1:
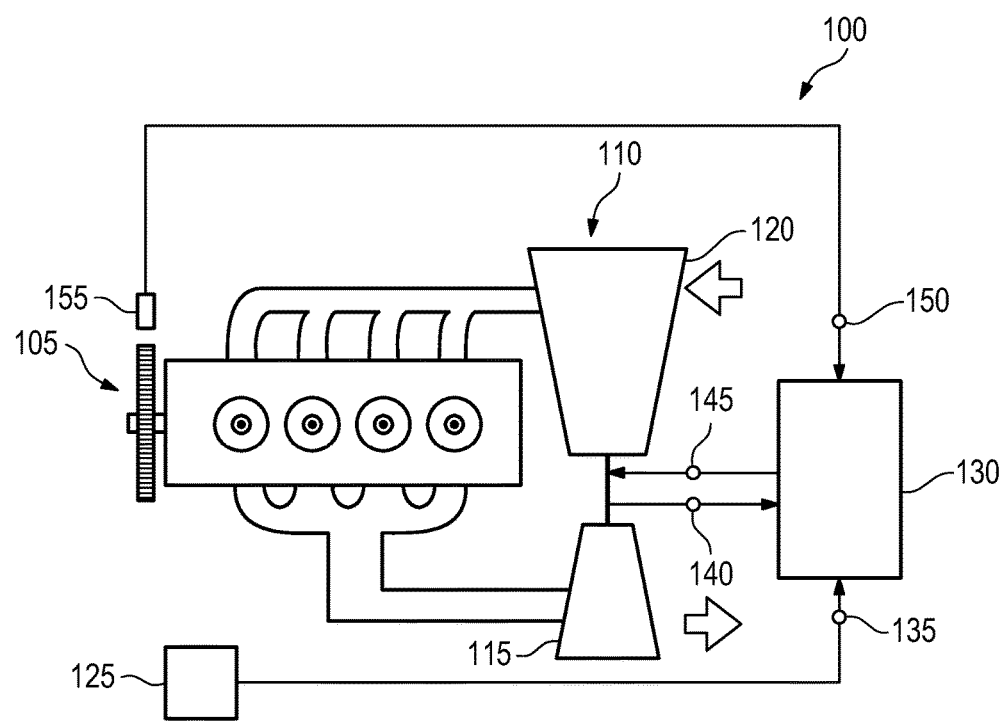
FIG. 1 illustrates a drive train for a motor vehicle.

Improved technology for controlling a setpoint charging pressure for a turbocharger is described herein.

A turbocharger is driven by means of exhaust gas of an internal combustion engine. A method for controlling a setpoint charging pressure of the turbocharger comprises steps of determining a charge-based setpoint charging pressure on the basis of a charge of the internal combustion engine; sampling an actual charging pressure; determining a carried-along actual charging pressure on the basis of the actual charging pressure; determining an offset on the basis of the charge-based setpoint charging pressure; and adjusting the setpoint charging pressure by open-loop control to the charge-based setpoint charging pressure by means of a first-order timing element, if the carried-along actual charging pressure exceeds a value which is lower than the charge-based setpoint charging pressure by the offset.

In other words, the setpoint charging pressure of open-loop or closed-loop control of the charging pressure of the turbocharger is adapted in such a way that overshooting of the actual charging pressure above the setpoint charging pressure is prevented. For this purpose, when there is a strongly rising actual charging pressure the setpoint charging pressure is temporarily lowered in order to reduce the difference between the two variables. The temporary lowering of the setpoint charging pressure is preferably carried out by means of an offset.

The method can be used between a controller, which determines the charge-based setpoint charging pressure on the basis of a charge of the internal combustion engine, and adjustment of the charging pressure by open-loop or closed-loop control to the determined setpoint charging pressure. For this purpose, the first-mentioned or the last-mentioned component can alternatively be adapted correspondingly. In one embodiment, the determination of the charge-based setpoint charging pressure, the described method and the adjustment of the charging pressure by open-loop or closed-loop control can also be carried out in a common method.

The offset determines the difference between the charge-based setpoint charging pressure and the carried-along actual charging pressure which has to be at least reached in order to bring about the described temporary lowering of the setpoint charging pressure. It is preferred that the offset is determined on the basis of the charge-based setpoint charging pressure and a rotational speed of the internal combustion engine. Therefore, in particular non-linear relationships between the rotational speed of the internal combustion engine and the charging pressure of the turbocharger can be modulated in an improved fashion.

In this context, the offset can be determined, in particular, by means of a first characteristic diagram. The characteristic diagram is made to extend here over the rotational speed of the internal combustion engine and the charge-based setpoint charging pressure.

The carried-along actual charging pressure is preferably determined on the basis of the sum of the actual charging pressure and of a defined value which is determined on the basis of the charge-based setpoint charging pressure and of the actual charging pressure. The determined carried-along actual charging pressure can be easy to determine, and can reflect in an improved way the conditions which are actually present at the turbocharger.

The defined value can be determined, in particular, on the basis of gradients of the charge-based setpoint charging pressure and of the actual charging pressure. Considering the gradients causes the change in the respective parameter over time also to be included in the determination. The gradients can each be determined by deriving the respective parameter over time. By using the chronologically derived parameters it is possible to modulate the dynamics of the turbocharger in an improved way.

It is particularly preferred that the defined value is determined by means of a second characteristic diagram. The second characteristic diagram is made to extend here between a gradient of the charge-based setpoint charging pressure and the gradient of the actual charging pressure.

A timing constant of the first-order timing element can be fixedly selected in a first embodiment or in a further embodiment can be determined dynamically on the basis of the charge-based setpoint charging pressure and of the actual charging pressure. The fit of the setpoint charging pressure with respect to the charge-based setpoint charging pressure over time can as a result be controlled in an improved fashion. Finally, the actual charging pressure can be approximated in an improved rapid fashion and without overshooting to the charge-based setpoint charging pressure.

The timing constant can be determined on the basis of gradients of the charge-based setpoint charging pressure and of the actual charging pressure. In this context it is possible to proceed as during the determination of the abovementioned value by means of the second characteristic diagram. In particular, the timing constant can be determined by means of a third characteristic diagram. In one embodiment, the second and the third characteristic diagrams are implemented integrated with one another and make available two parameters, specifically the abovementioned value and the described timing constant.

A device for controlling a setpoint charging pressure for a turbocharger which is driven by means of exhaust gas of an internal combustion engine comprises: a first interface for determining a charge-based setpoint charging pressure; a second interface for sampling an actual charging pressure; and a processor which is configured to determine a carried-along actual charging pressure on the basis of the actual charging pressure; to determine an offset on the basis of the charge-based setpoint charging pressure; and to adjust the setpoint charging pressure by open-loop control to the charge-based setpoint charging pressure by means of a first-order timing element, if the carried-along actual charging pressure exceeds a value which is lower than the setpoint charging pressure by the offset. In particular, the device can be configured to carry out the method described above. The device can be used in an internal combustion engine with a turbocharger and can be integrated with a control device for the internal combustion engine or a control device for the turbocharger. The processor of the device can be, in particular, a programmable microcomputer or microcontroller.

FIG. 1 shows a drive train 100, in particular for a motor vehicle. The drive train 100 comprises an internal combustion engine 105, a turbocharger 110 and optionally also further elements such as a clutch, a transmission or a drive wheel, which are not illustrated in FIG. 1. The turbocharger 110 comprises an exhaust gas turbine 115 and a compressor 120, which are usually coupled to one another by means of a rigid shaft. Air is compressed and fed to the internal combustion engine 105 by means of the compressor 120. At said internal combustion engine 105, the air is mixed with fuel, and the mixture is burnt. The exhaust gas which is produced in the process is fed to the exhaust gas turbine 115 which drives the compressor 120 mechanically.

The charging pressure which is made available by the turbocharger 110 can be controlled. The control can be carried out, for example, by adjusting a variable turbine geometry or adjusting a valve which influences the quantity of exhaust gas flowing through the exhaust gas turbine 115. The setpoint charging pressure which is to be set can be made available, for example, by an engine controller 125. The engine controller 125 can additionally be configured to receive parameters at the internal combustion engine 105 such as a temperature, an air mass flow rate or a lambda value in the exhaust gas section and to control actuators at the internal combustion engine 105 which influence the operating state. The actuators can comprise, in particular, a fuel injector, a valve adjustment device or an ignition.

The actual charging pressure of the turbocharger 110 can be adjusted by open-loop or closed-loop control to the supplied setpoint charging pressure by means of a device 130. The device 130 can be implemented integrated with the engine controller 125. It is proposed that the supplied setpoint charging pressure be manipulated under certain circumstances in order to achieve an improved time profile of the actual charging pressure with respect to the setpoint charging pressure. In particular, the actual charging pressure is to be approximated as rapidly as possible to the setpoint charging pressure, is not to exceed it and is to have a profile which is as harmonic as possible. In the illustrated embodiment, the device 130 is embodied integrated with a controller of the turbocharger 110, but in another embodiment the device 130 can also be embodied separately therefrom.

The device 130 can be connected, for example, to the engine controller 125 by means of a first interface 135 in order to receive the setpoint charging pressure. A second interface 140 can be provided in order to sample the actual charging pressure of the turbocharger 110. In one embodiment, the turbocharger 110 is influenced via a third interface 145. A fourth interface 150 is also optionally provided via which the device 130 is connected to a rotational speed sensor 155 or to another component which supplies the rotational speed 218 of the internal combustion engine 105.

Figure 2:
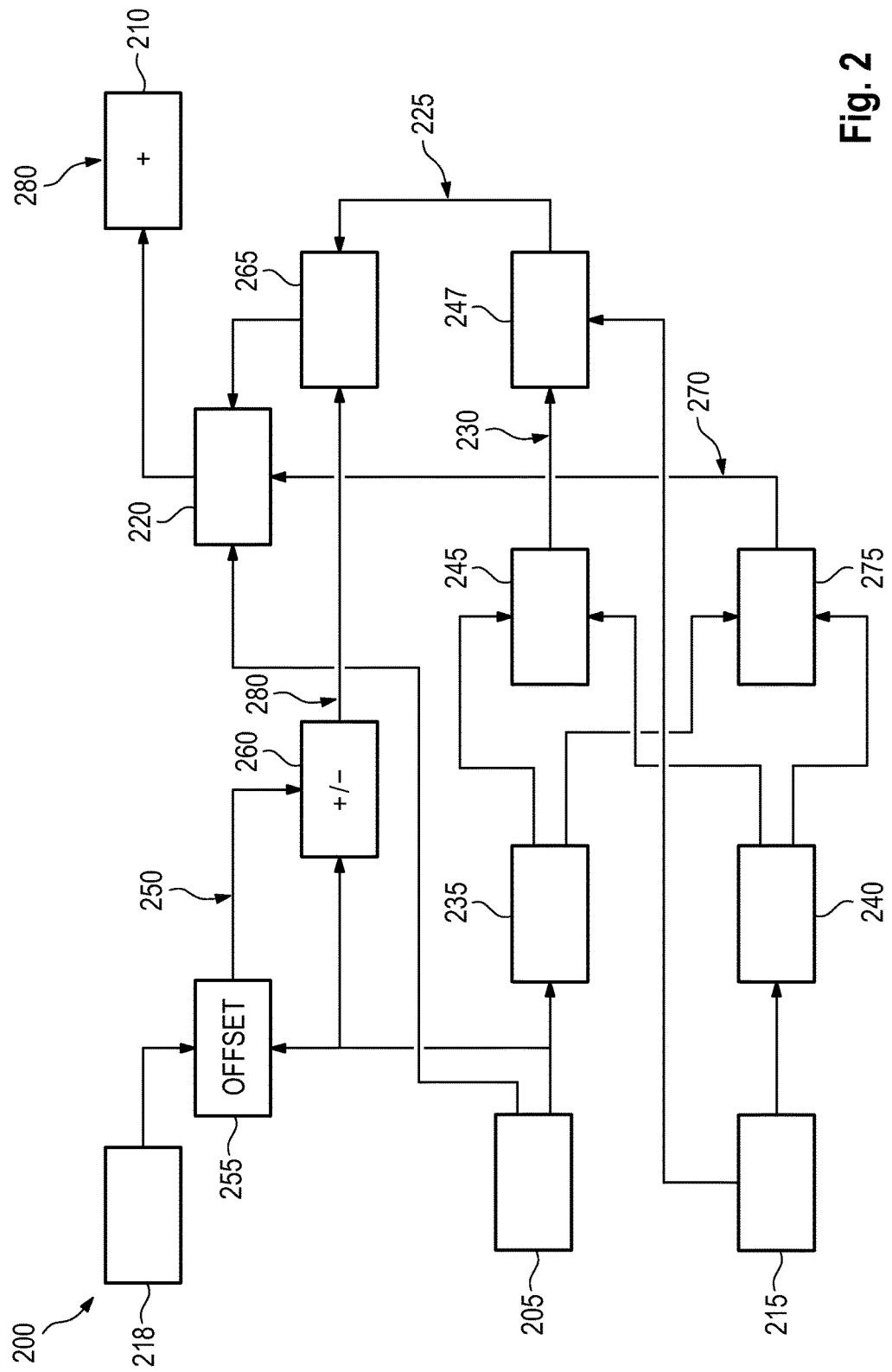
FIG. 2 illustrates a flowchart of a method for controlling a setpoint charging pressure of a turbocharger of the drive train in FIG. 1.

FIG. 2 shows a flowchart of a method 200 for controlling the setpoint charging pressure of the turbocharger 110. The method 200 can run, in particular, on the device 130, for example in the form of a computer program product. The method 200 is configured to supply, on the basis of a charge-based setpoint charging pressure 205, which can be received via the interface 135, a setpoint charging pressure 210 which can be set at the turbocharger 110, for example by means of a P controller, a PI controller, a PID controller or some other conventional controller. In another embodiment, the actual charging pressure 215 can likewise be set at the turbocharger 110 by means of the method 200. In some embodiments, the method 200 also makes use of a rotational speed 218 which it can receive, in particular, via the interface 150.

It is proposed that the charge-based setpoint charging pressure 205 be adapted under certain circumstances by means of an offset 250 and a subsequent first-order (PT1) timing element 220, in order to prevent an excessively rapid rise and, in particular, overshooting of the actual charging pressure 215 above the charge-based setpoint charging pressure 205. For this purpose, the supplied setpoint charging pressure 210 is temporarily lowered, with the result that it approximates to the charge-based setpoint charging pressure 205 with a predetermined speed.

A carried-along actual charging pressure 225 is preferably determined, which actual charging pressure 225 can be determined in an adding element 247 as a sum of the actual charging pressure 215 and of a value 230. The value 230 is determined on the basis of the charge-based setpoint charging pressure 205 and the actual charging pressure 215. In a step 235, a gradient of the charge-based setpoint charging pressure 205 is preferably determined, and in a step 240 a gradient of the actual charging pressure 215 is preferably determined. The searched-for value 230 can be determined on the basis of the determined gradients, for example by means of a characteristic diagram 245.

An offset 250 is preferably determined on the basis of the rotational speed 218 and of the charge-based setpoint charging pressure 205. For this purpose, a characteristic diagram 255 can be used. The offset 250 is subtracted from the charge-based setpoint charging pressure 205 in a step 260. The result is compared in a step 265 with the carried-along actual charging pressure 225. If the carried-along actual charging pressure 225 exceeds the result, that is to say if the carried-along actual charging pressure 225 is below the charge-based setpoint charging pressure 205 by less than the offset 250, the timing element 220 is activated.

A timing constant 270 of the timing element 220 can be permanently predefined or determined dynamically. For the dynamic determination, the timing constant 270 can be determined on the basis of the charge-based setpoint charging pressure 205 and the actual charging pressure 215. For this purpose, in particular the gradients determined in the steps 235 and 240 can be considered again. It is preferred to determine the timing constant 270 by means of a characteristic diagram 275, specifically more preferably on the basis of the gradients.

Figure 3:
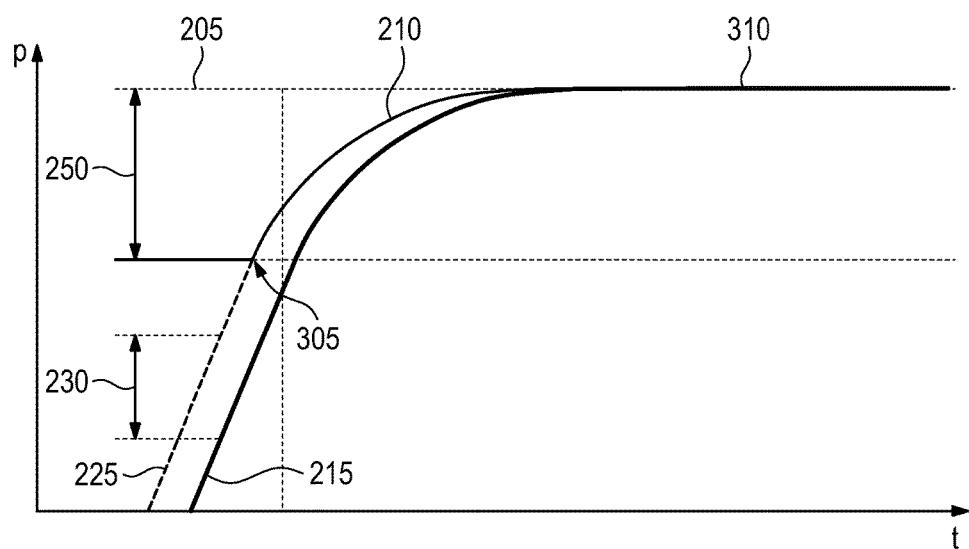
FIG. 3 is an illustration of the method in FIG. 2.

FIG. 3 shows an illustration of the method 200 in FIG. 2. A time is plotted in the horizontal direction, and a charging pressure in the vertical direction.

Starting from a time 305, the carried-along actual charging pressure 225 is less than the charge-based setpoint charging pressure 205 by less than the offset 250. The setpoint charging pressure 210 is temporarily lowered by means of the offset 250, in order to gradually fit with respect to the charge-based setpoint charging pressure 205 by means of the timing element PT1 220. At the time 305 of the intersection point of the carried-along actual charging pressure 225 and of the charge-based setpoint charging pressure 205 which is reduced by the offset 250, the PT1 profile of the setpoint charging pressure 210 starts. The latter adjusts the setpoint charging pressure 210 from the value of the charge-based setpoint charging pressure 205 minus the offset of the offset 250 to the original, charge-based setpoint charging pressure 205. The timing constant 270 of the PT1 profile is preferably obtained here from the characteristic diagram 275.

The determined setpoint charging pressure 210 overwrites the charge-based setpoint charging pressure 205. At the time 310, both variables are identical. As soon as the charge-based charging pressure 205 minus the offset 205 corresponds to the actual charging pressure 215 plus the defined value 230, a PT1 profile starts which adjusts the actual charging pressure 215 to the target value of the charge-based setpoint charging pressure 205.

Figure 4:
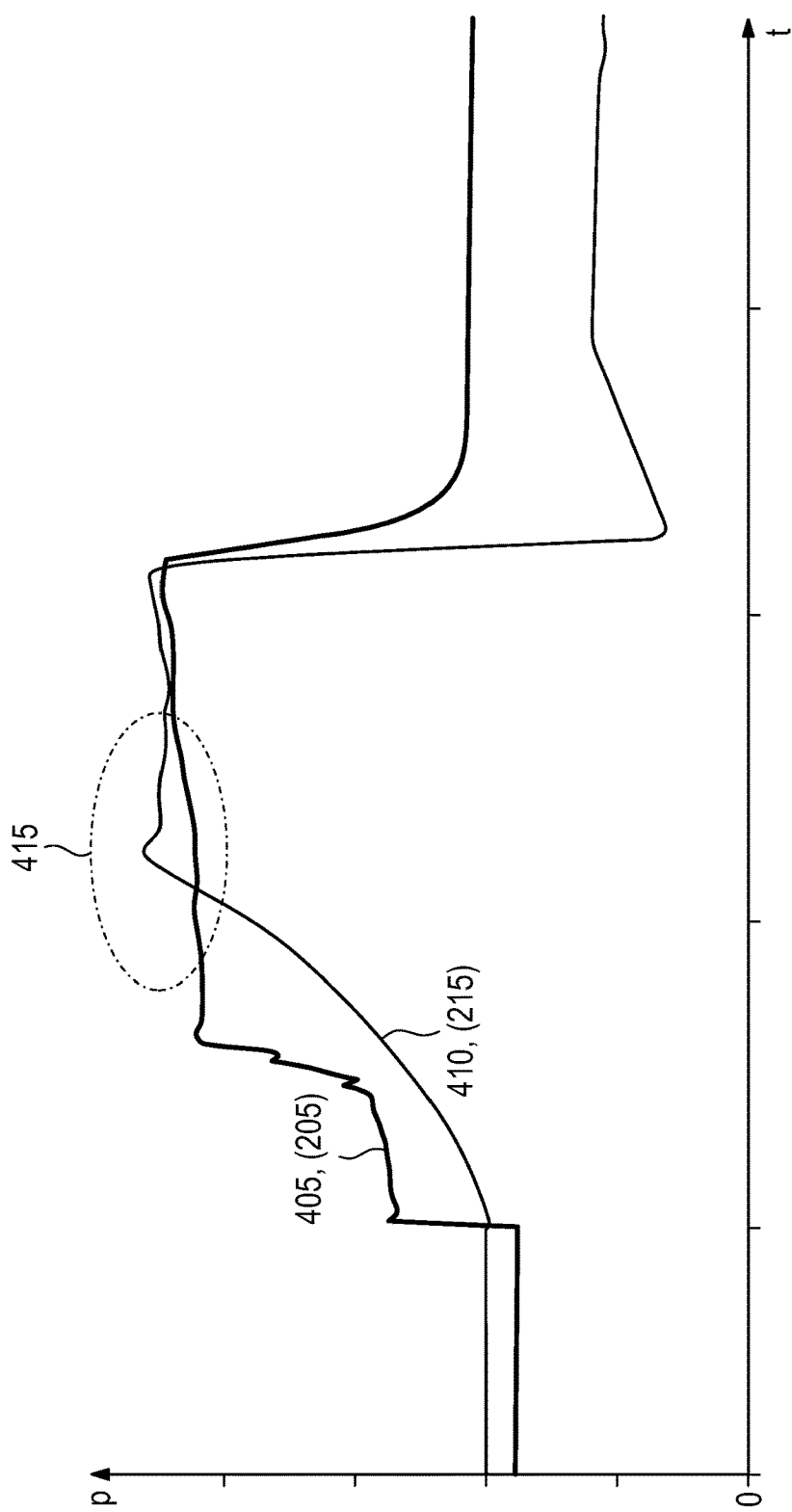
FIG. 4 illustrates setpoint and actual charging pressures on a turbocharger with conventional control.

FIG. 4 shows a charge-based setpoint charging pressure 205 and an actual charging pressure 215 at a turbocharger 110 with conventional control. In the exemplary illustration, a time is plotted in the horizontal direction and a charging pressure in the vertical direction. The illustrated scales and quantitative profiles are purely exemplary. A first profile 405 reflects the charge-based setpoint charging pressure 205, and a second profile 410 reflects the actual charging pressure 215. In a region 415 the second profile 410 overshoots the predefined value of the first profile 405. A transition between the actual charging pressure 410, 215 rising and being essentially kept constant has a non-harmonious effect.

Figure 5:
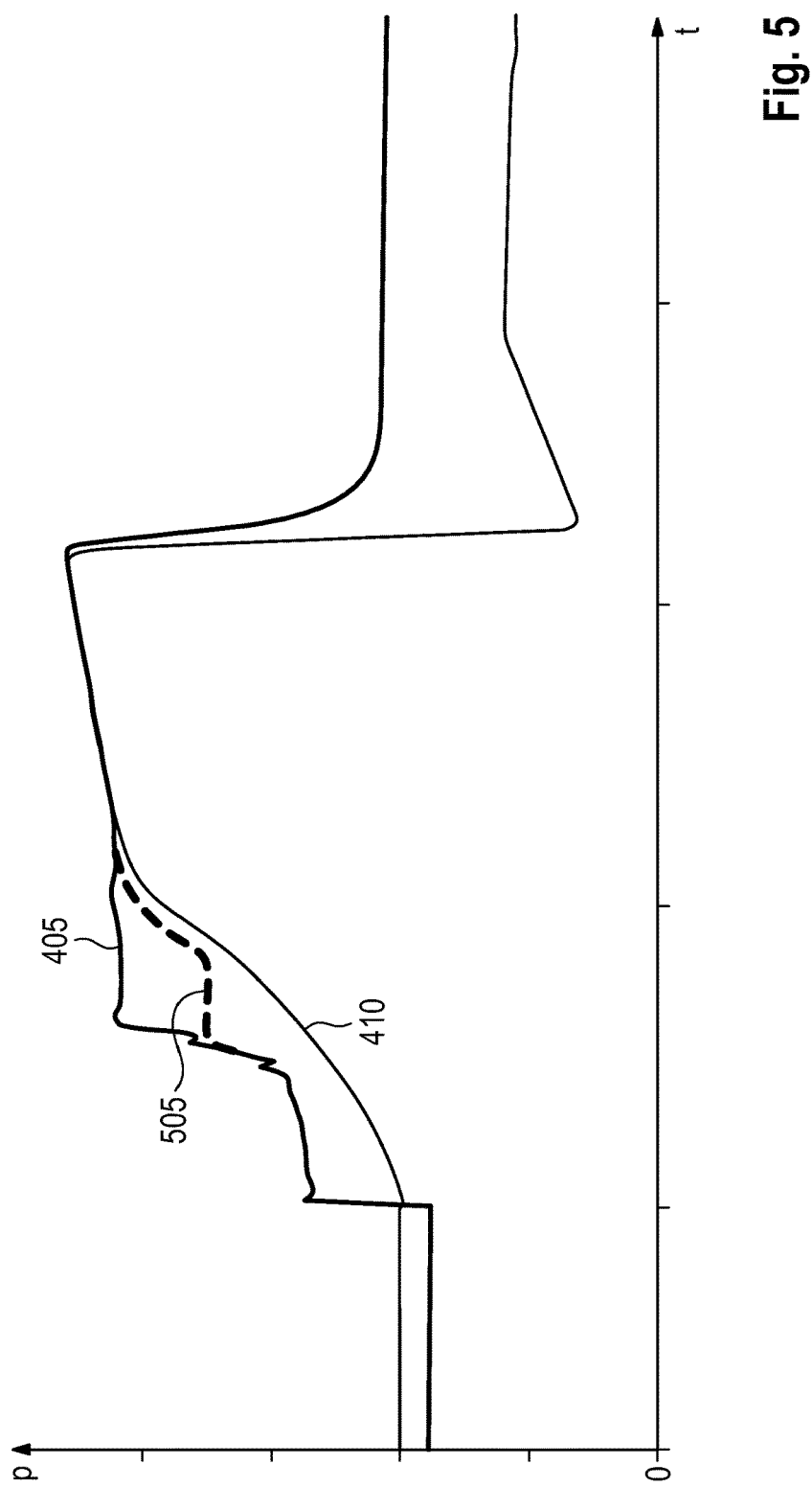
FIG. 5 illustrates setpoint and actual charging pressures on a turbocharger with control by means of the method of FIG. 2.

FIG. 5 shows a corresponding illustration with control by means of the method 200 in FIG. 2. A profile 505 shows the deviating behavior of the method 200, conditioned by the offset 250 and the temporarily activated timing element 220, during the approximation of the actual charging pressure 215 to the charge-based setpoint charging pressure 205. The profile 505 temporarily lowers the predefined setpoint charging pressure 210, in order to permit a harmonious fit of the actual charging pressure 215 with respect to the charge-based setpoint charging pressure 205. An overshoot of the actual charging pressure 215 above the charge-based setpoint charging pressure 205 can be avoided. Nevertheless, a rapid rise of the actual charging pressure 215 takes place.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 Drive Train
105 Internal Combustion Engine
110 Turbocharger
115 Exhaust Gas Turbine
120 Compressor
125 Engine Controller
130 Device
135 First Interface
140 Second Interface
145 Third Interface
150 Fourth Interface
155 Rotational Speed Sensor
200 Method
205 Charge-base Setpoint Charging Pressure
210 Setpoint Charging Pressure
215 Actual Charging Pressure
218 Rotational Speed
220 First-order Timing Element
225 Carried-along Actual Charging Pressure
230 Value
235 Determine Gradient of the Charge-based Setpoint Charging Pressure 205
240 Determine Gradient of the Actual Charging Pressure 215
245 Characteristic Diagram
247 Summing
250 Offset
255 Characteristic Diagram
260 Subtraction
265 Comparison
270 Timing Constant
275 Characteristic Diagram
280 Difference between 205 and 250
290 Addition of 220 and 280
305 Time for Start of PT1
310 Time When New Setpoint Charging Pressure 210=Charge-based Setpoint Charging Pressure 205
405 First Profile (charge-based setpoint charging pressure)
410 Second Profile (actual charging pressure)
415 Region
505 Profile of the New Setpoint Charging Pressure 210

What is claimed is:

1. A method for controlling a setpoint charging pressure for a turbocharger configured to be driven by exhaust gas of an internal combustion engine, the method comprising:
   determining, based on a charge of the internal combustion engine, a charge-based setpoint charging pressure for the turbocharger;
   sampling an actual charging pressure of the turbocharger;
   determining, based on the sampled actual charging pressure, a carried-along actual charging pressure of the turbocharger;
   determining, based on the charge-based setpoint charging pressure, an offset;
   defining a first value as the charge-based setpoint pressure less the offset;
   detecting that the carried along actual charging pressure exceeds the first value;
   in response to detecting that the carried along actual charging pressure exceeds the first value, setting, by open-loop control, the setpoint charging pressure to the charge-based setpoint charging pressure by a first-order timing element to provide an adjusted setpoint charging pressure;
   supplying the adjusted setpoint charging pressure to the turbocharger; and
   operating the turbocharger according to the supplied adjusted setpoint charging pressure.

2. The method as claimed in claim 1, wherein the offset is determined on the basis of the charge-based setpoint charging pressure and a rotational speed of the internal combustion engine.

3. The method as claimed in claim 2, wherein the offset is determined by using a first characteristic diagram.

4. The method as claimed in claim 1, wherein the carried-along actual charging pressure is determined on the basis of a sum of the actual charging pressure and of a second value which is determined on the basis of the charge-based setpoint charging pressure and of the actual charging pressure.

5. The method as claimed in claim 4, wherein the second value is determined on the basis of gradients of the charge-based setpoint charging pressure and of the actual charging pressure.

6. The method as claimed in claim 4, wherein the second value is determined by using a second characteristic diagram.

7. The method as claimed in claim 1, wherein a timing constant of the timing element is determined on the basis of the charge-based setpoint charging pressure and of the actual charging pressure.

8. The method as claimed in claim 7, wherein the timing constant is determined on the basis of gradients of the charge-based setpoint charging pressure and of the actual charging pressure.

9. The method as claimed in claim 7, wherein the timing constant is determined by using a third characteristic diagram.

10. A controller configured to control a setpoint charging pressure for a turbocharger that is driven by exhaust gas of an internal combustion engine, the device comprising:
   a first interface configured to receive a charge-based setpoint charging pressure from an engine controller of the internal combustion engine;
   a second interface configured to sample an actual charging pressure of the turbocharger;
   a processor configured to:
      determine, based on the sampled actual charging pressure, a carried-along actual charging pressure of the turbocharger,
      determine, based on the charge-based setpoint charging pressure, an offset,
      define a first value as the charge-based setpoint pressure less the offset,
      detect that the carried along actual charging pressure exceeds the first value,
      in response to detecting that the carried along actual charging pressure exceeds the first value, set, by open-loop control, the setpoint charging pressure to the charge-based setpoint charging pressure by using a first-order timing element to provide an adjusted setpoint charging pressure; and
   a third interface configured to supply the adjusted setpoint charging pressure to the turbocharger so as to cause the turbocharger to operate according to the adjusted setpoint charging pressure.

* * * * *